United States Patent
Agarwal et al.

(10) Patent No.: US 10,013,688 B2
(45) Date of Patent: Jul. 3, 2018

(54) OFFLINE DELIVERY OF CONTENT AVAILABLE IN VOICE APPLICATIONS

(75) Inventors: Sheetal Agarwal, Maharashtra (IN); Arun Kumar, Noida (IN)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 13/598,370

(22) Filed: Aug. 29, 2012

(65) Prior Publication Data

US 2013/0030816 A1 Jan. 31, 2013

Related U.S. Application Data

(63) Continuation of application No. 13/191,590, filed on Jul. 27, 2011.

(51) Int. Cl.
G10L 21/00 (2013.01)
G06Q 20/12 (2012.01)
G06Q 30/06 (2012.01)
H04M 3/493 (2006.01)

(52) U.S. Cl.
CPC ....... G06Q 20/123 (2013.01); G06Q 30/0601 (2013.01); H04M 3/493 (2013.01); G10L 21/00 (2013.01); H04M 2203/1058 (2013.01)

(58) Field of Classification Search
CPC .................................... G10L 21/00
USPC .................. 705/50–79; 704/270.1
See application file for complete search history.

(56) References Cited

U.S. PATENT DOCUMENTS

| | | | |
|---|---|---|---|
| 6,792,086 B1 * | 9/2004 | Saylor et al. | 379/88.17 |
| 7,127,403 B1 | 10/2006 | Saylor et al. | |
| 7,516,190 B2 | 4/2009 | Kurganov | |
| 2001/0047262 A1 * | 11/2001 | Kurganov | H04M 3/4938 704/270.1 |
| 2005/0141684 A1 * | 6/2005 | Ogbumor | H04L 12/66 379/93.12 |
| 2006/0167849 A1 | 7/2006 | Marcus et al. | |
| 2008/0144783 A1 | 6/2008 | Kumar et al. | |
| 2008/0189187 A1 * | 8/2008 | Hao | G06F 17/243 705/26.41 |
| 2009/0254971 A1 | 10/2009 | Herz et al. | |
| 2009/0318119 A1 | 12/2009 | Basir et al. | |
| 2010/0255890 A1 * | 10/2010 | Mikkelsen | G06Q 10/06 455/567 |

FOREIGN PATENT DOCUMENTS

WO 2008/100420 8/2008

OTHER PUBLICATIONS

Kumar, Arun, et al., "The spoken web application framework: user generated content and service creation through low-end mobiles", W4A2010—Technical, co-located with the 19th International World Wide Web Conference, Apr. 26-27, 2010, 10 pages, Raleigh, North Carolina, USA.

* cited by examiner

Primary Examiner — Rutao Wu
Assistant Examiner — Darnell A Pouncil
(74) Attorney, Agent, or Firm — Ference & Associates LLC

(57) ABSTRACT

Methods and arrangements for facilitating offline delivery of content available in voice applications. User access to a voice application is permitted, and the user is accorded a capability to select content in the voice application for offline delivery. The selected content is stored in a holding arrangement, and the selected content is availed for delivery to the user.

20 Claims, 4 Drawing Sheets

OFFLINE DELIVERY OF CONTENT AVAILABLE IN VOICE APPLICATIONS

CROSS REFERENCE TO RELATED APPLICATION

This application is a continuation of U.S. patent application Ser. No. 13/191,590, entitled SYSTEMS AND METHODS FOR OFFLINE DELIVERY OF CONTENT AVAILABLE IN VOICE APPLICATIONS, filed on Jul. 27, 2011, which is incorporated by reference in its entirety.

BACKGROUND

The lack of internet access in many parts of the world, especially in developing countries, has given rise to voice applications with a capability for user-generated content. These permit a user to phone into a number and access voice application sites analogous to websites, yet controlled, delivered and administered via audio and voice. Voice application platforms and associated sites thus represent tremendous potential for utility, but unfortunately a range of versatility analogous to that offered via internet access has hitherto largely remained out of reach.

BRIEF SUMMARY

In summary, one aspect of the invention provides a method comprising: permitting user access to a voice application; according the user a capability to select content in the voice application for offline delivery; storing the selected content in a holding arrangement; and availing the selected content for delivery to the user.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
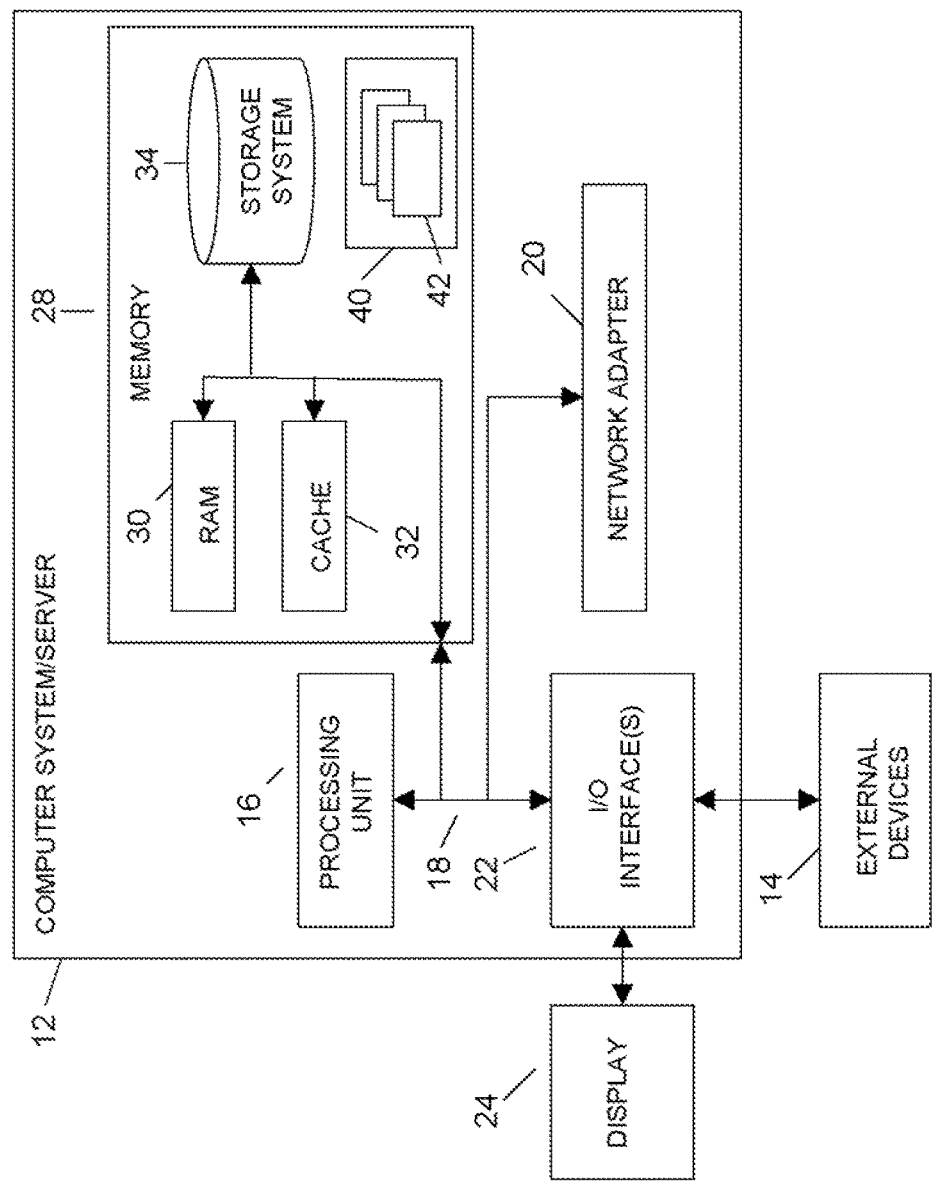
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, at least one processor or processing unit 16, a system memory 28, and a bus 18 that couples various system components including system memory 28 to processor 16.

Bus 18 represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, at least one application program, other program modules, and program data. Each of the operating system, at least one application program, other program modules, and program data or some combination thereof, may include an implementation of a networking environment. Program modules 42 generally carry out the functions and/or methodologies of embodiments of the invention as described herein.

Computer system/server 12 may also communicate with at least one external device 14 such as a keyboard, a pointing device, a display 24, etc.; at least one device that enable a user to interact with computer system/server 12; and/or any devices (e.g., network card, modem, etc.) that enable computer system/server 12 to communicate with at least one other computing device. Such communication can occur via I/O interfaces 22. Still yet, computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
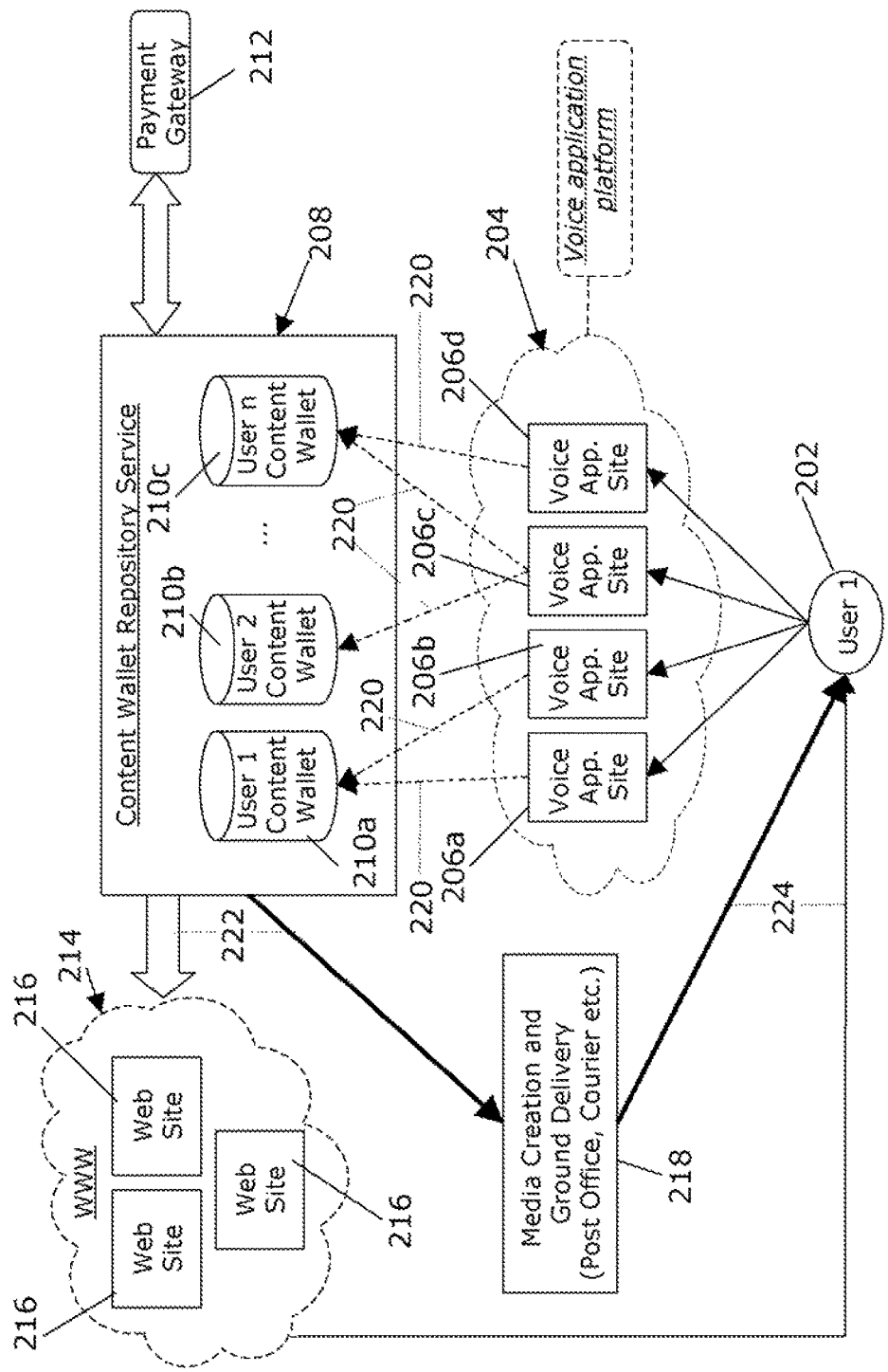
FIG. 2 schematically illustrates an arrangement for creating content wallets in the context of a voice application platform.
Figure 3:
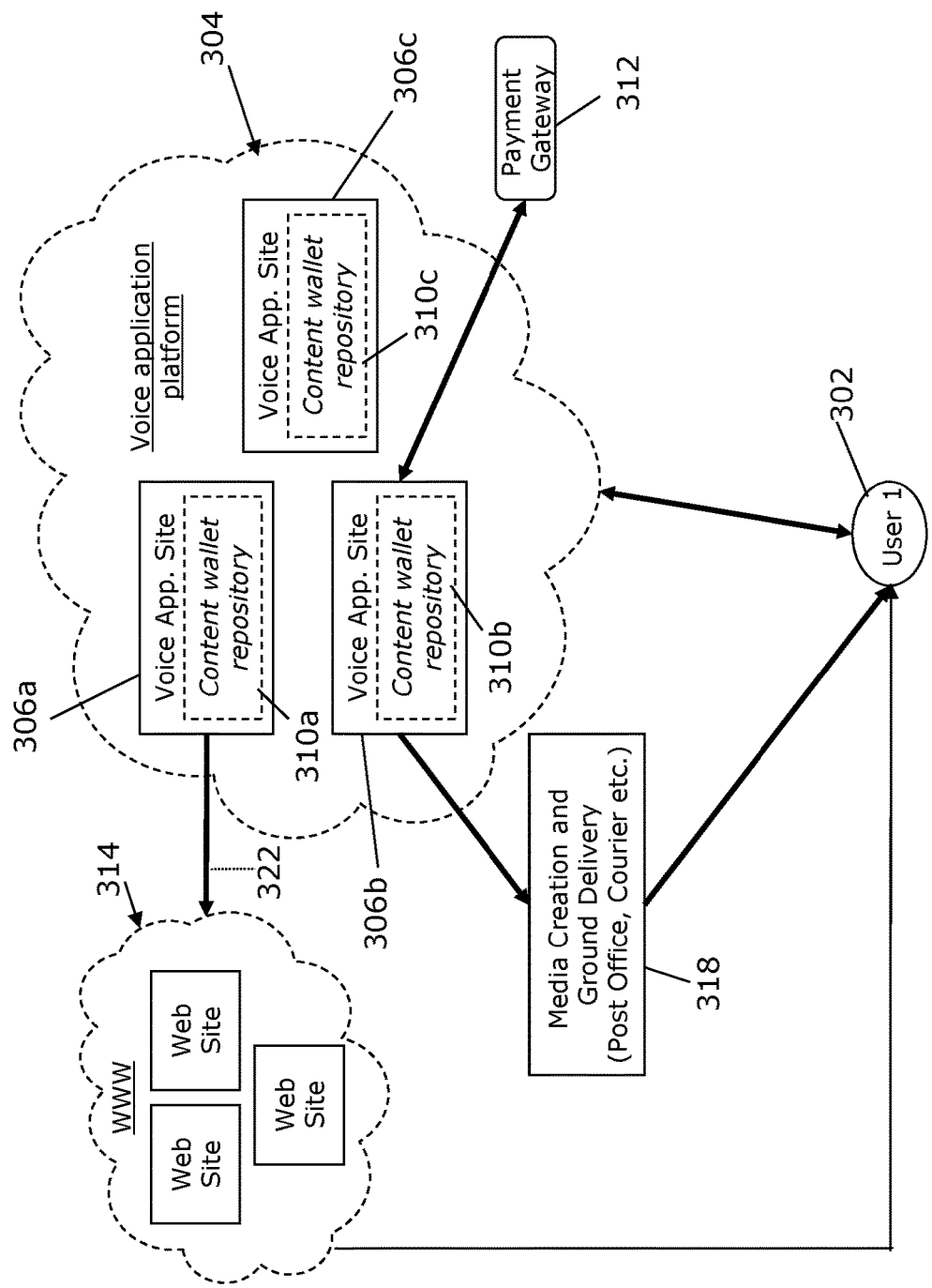
FIG. 3 schematically illustrates a variant arrangement for creating content wallets in the context of a voice application platform.

The disclosure now turns to FIGS. 2 and 3. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 2 and 3 can be performed or utilized by way of a processing unit or units and system memory such as those indicated, respectively, at 16 and 28 in FIG. 1, whether on a server computer, a client computer, a node computer in a distributed network, or any combination thereof.

To facilitate easier reference, in advancing from FIG. 2 to and through FIG. 3, a reference numeral is advanced by a multiple of 100 in indicating a substantially similar or analogous component or element with respect to at least one component or element found in at least one earlier figure among FIGS. 2 and 3.

Generally, the creation of audio content continues to evolve for use in new applications. One such application is the World Wide Telecom Web (WWTW), also referred to as the 'Telecom Web' or the 'Spoken Web.' The Spoken Web is a network of VoiceSites hosted on the telecom network, wherein each voice site individually comprises a voice driven application. The Spoken Web system may be viewed as a telecom network parallel to the World Wide Web (WWW) that runs on the Internet infrastructure. VoiceSites are accessed by calling the number associated with the VoiceSite, called a VoiNumber. A VoiLink is used to link the various VoiceSites to one another. A VoiceSite may be created or updated through a voice driven interface, such that a program creator may create a VoiceSite or modify an existing VoiceSite using a cellular phone. The Spoken Web is an ideal solution for a large part of the world were the population does not have access to the devices necessary to access the Internet, but cellular phone penetration is high. As a result, the use of the Spoken Web and the number of VoiceSites continue to increase. Thus, the volume of audio content associated with the Spoken Web continues to steadily expand.

Generally, the World Wide Telecom Web and interconnected voice applications (VoiceSites) and can be accessed by any voice-capable (e.g., landline or cellular) telephone. In the course of an ordinary phone call, the user interacts with a service or other application through speech or DTMF (dual tone multi frequency, or the signal to the phone company that is generated when one presses the touch keys of a telephone, which can also be referred to as "touch tone" or "telephone touch tone").

By way of further background in accordance with at least one embodiment of the invention, SWAF (Spoken Web Application Framework) can be used in creating VoiceSites. Background information on SWAF may be found in A. Kumar et al., "The Spoken Web Application Framework User Generated Content and Service Creation through low-end mobiles" in the 19th International World Wide Web Conference (co-located with the 2010 W4A Technical Conference).

In accordance with at least one embodiment of the invention, in a voice application with a capability for user generated content (such as VoiceSites), there is broadly contemplated herein the employment of a content wallet, whereby a user may selectively designate information or data that can be reviewed offline.

In accordance with at least one embodiment of the invention, and as shown schematically in FIG. 2, a user 202 can have access to a voice application platform 204 (e.g., a Spoken Web network) and a variety of voice application sites 206a/b/c/d that form the core of the platform 204. Each site 206a/b/c/d can be embodied as any suitable voice application site, such as an individual voice application site, an information portal or a business site.

In accordance with at least on embodiment of the invention, and as discussed hereabove, the platform 204 permits user 202 to create his/her own applications and content (e.g., in the form of sites 206a/b/c/d) via audio interaction in a telephone call. The sites 206a/b/c/d are thereafter accessible to user 202 and even possibly other users but, conventionally, any and all user generated content (UGC) associated therewith is not available offline. This has normally prevented a user 202 from effectively saving content in which he/she may be interested, e.g., for use at a later time. In other words, in conventional arrangements, any and all content generated on the platform 204 (e.g., sites 206a/b/c/d) is accessible only when the user 202 makes a phone call, thus necessitating repeated calls to re-access any and all desired content.

In accordance with at least one embodiment of the invention, UGC is made available with a user's permission, and can be replicated in a content wallet that becomes available offline for the use of one or more users. As shown, during the time that user 202 (here designated as "User 1") uses platform 204, he/she can designate certain audio items or data from at least one voice application site (here sites 206a and 206b) to be apportioned or copied into his/her own designated content wallet 210a at a content wallet repository service 208. Likewise, a "User 2" can build his/her own content wallet 210b (here, from site 206c) as can other users up to and including n users (thus, as shown by way of another example, a "User n" can apportion content into his/her own wallet 210c from sites such as 206c and 206d).

In accordance with at least one embodiment of the invention, a suitable payment gateway 212 is available for charging a user at such a time that the user wishes to have his/her content wallet delivered, and to the extent that some or all of the content in the wallet might necessitate a charge for the user. (For instance, content originating from the user him/herself might not incur a charge, but content from other users, to the extent they permit it to be copied or downloaded, indeed might.) As shown, delivery may take place via any of a variety of suitable mechanisms. For instance, by way of one non-restrictive example, content can be availed to at least one web site 216 on the World Wide Web 214, which user 202 can then conveniently download or at least avail (e.g., through a secure mechanism such a password-based portal). On the other hand, and particularly in a context where user 202 does not have or cannot access a computer (or, e.g., content-enabled mobile phone), an arrangement for media creation and ground delivery (218) can be provided. Here, audio content from the user's content wallet can be reproduced on media such as a compact disc and then be delivered to the user via an arrangement such as standard mail or a courier, etc.

In accordance with at least one embodiment of the invention, it can be appreciated that content is transmitted in three different stages. Indicated at 220 is content that user 202 deposits to at least one content wallet (at the repository service 208) while interacting with voice application platform 204. Content 222, on the other hand, represents that content selected by user 202 for offline delivery (whether, e.g., via the World Wide Web 214, a media creation arrangement 218, or some other arrangement). Thence, content 224 represents that spoken web content that ultimately is delivered to the user 202.

To elaborate further, in accordance with at least one embodiment of the invention, it will be appreciated that a content wallet (210a/b/c) comprises a repository of content collected by a user 202 of a voice application platform 204 for offline delivery or later perusal. User 202 can continue to add content to a wallet (e.g., 210a) while browsing various voice application sites (e.g., 206a/b/c/d). In example embodiments, while adding content to a content wallet (e.g., 210a), the user 202 can annotate the content with spoken tags or in other suitable ways. Essentially, a wallet 210a/b/c belongs to or is associated with a particular user, wherein other users are not able to post content into that user's wallet. However, in accordance with a variant embodiment of the invention, a shared wallet is possible, wherein a fixed set of authorized users can deposit content into the shared wallet. Further, inasmuch as a shared wallet is not present, a user can still share content of interest with another user, e.g., by sending to the other user a link to such content.

In accordance with at least one embodiment of the invention, at essentially any point in time or at predetermined intervals (e.g., based on time increments or a predetermined accumulation of content), user 202 can request delivery (222, 224) of the content for offline consumption. The content can be delivered in physical form (e.g., via a media creation arrangement 218), such as CDs, audio tapes, USB (universal serial bus) sticks, or via soft copies (e.g., via World Wide Web 214) such as MP3, email, MMS (multimedia messaging service), online file and content sharing accounts, or other analogous arrangements.

In accordance with at least one embodiment of the invention, delivered content (224) can be packaged with meta-information across several dimensions that include, for instance: an identifying name and number for the voice application site (from which the content derives); time at which the content was browsed and collected; and user-generated annotations including annotations from a requesting user as well as other users. If a charge for offline content delivery is involved, e.g., as applied by payment gateway 212, then such charges could include: a charge for the media employed for content delivery; a wallet hosting fee; processing/packaging charges; charges for the content itself; and delivery charges.

In accordance with at least one embodiment of the invention, a content wallet (e.g., 210a) is specific to user 202 and applicable across different voice application sites (206a/b/c/d). In other words, as user 202 browses through different voice application sites (206a/b/c/d), he/she is able to collect and bookmark content that he/she is interested in. To that end, details regarding content that can be stored in a content wallet (e.g., 210a) can include: a voice application site identifier; the content URI (uniform resource identifier); and possibly a copy of the content itself.

In accordance with at least one embodiment of the invention, the life of a content wallet 210a/b/c can be represented by a single browsing session, or could persist across multiple browsing sessions. In other words, a content wallet 210a/b/c may be predetermined to be "complete", and thus ready for delivery, once a browsing session is over, or could remain "open", or available to receive additional content, after a browsing session is over.

In accordance with at least one embodiment of the invention, collection of content into a single one of the content wallets (e.g., 210a) involves providing support for content collection commands at every voice application site 206a/b/c/d. Further, each voice application site 206a/b/c/d can have a capability for exposing standard voice commands in its interface to allow content wallet operations, or a mechanism such as a voice application platform browser (e.g., a Spoken Web browser) can be assumed. In other words, a voice application site 206a/b/c/d will either directly expose voice API for content wallet commands, or will expose programmatic API's for the same. In the latter instance, voice application platform 204 can expose a voice API and forwards such commands to a voice application site 206a/b/c/d by invoking a corresponding programmatic API. In such a context, platform 204 becomes a main point of entry into the voice application in general, and remains active while the user 202 browses other sites. Commands intended for a content wallet 210a/b/c can be picked up by the platform 204, which can then execute the corresponding content wallet API on the site 206a/b/c/d being browsed.

In accordance with at least one embodiment of the invention, each voice application site 206a/b/c/d supports a mechanism to send content collection information (i.e., based on a user's selection) to repository service 208. This functionality could also be embedded in platform middleware through the use of HSTP (hyper speech transfer protocol).

In accordance with at least one embodiment of the invention, a content wallet repository service 208 offers application programming interfaces (API's) that are able to undertake at least the following steps with relation to individual content wallets 210a/b/c:

Register( )
OpenBrowsingSession( )
StoreContent (UserId, ContentDescription, authentication)
BrowseContent( )
DeliverContent (UserId, Description, Mode, authentication) [wherein "Mode" can represent online or ground delivery as discussed heretofore]
CloseBrowsingSession( )
Deregister( )

In accordance with at least one embodiment of the invention, a description of collected content at a content wallet 210a/b/c can include: descriptor or other identification for audio content; size; publisher; voice application site identifier; title; other descriptive information; content type (e.g., mp2, way, etc.); an annotation as discussed heretofore; a grouping or classification identifier for the content (to permit it to be grouped/classified with other content); and at least one other type of content label. It should be noted that, while contemplated here are essentially private content wallets 210a/b/c, a variant embodiment is conceivable in which the privacy level of a wallet 210a/b/c can be made be public, with different possible levels of permission accorded (e.g., read-only for a group, read-only for all, write-only for a group, write for all, etc.). In such non-private situations, where a wallet's content is accessible to others, the aforementioned descriptive information or even other information can reside outside the wallet (e.g., somewhere else in the repository 208), in addition to it residing inside the wallet 210a/b/c in question.

In accordance with at least one variant embodiment of the invention, as shown in FIG. 3, voice application sites 306a/b/c have individual content wallet repositories 310a/b/c, respectively, disposed within or directly associated with them. Accordingly, such an arrangement does not involve a separated content wallet repository service (e.g., as indicated at 208 in FIG. 2).

Thus, in accordance with at least one embodiment of the invention, a user 302 interacts with a voice application platform 304 and with voice application sites 306a/b/c associated therewith. However, here, when selecting content to be deposited into a content wallet, such action is undertaken within each voice application site 306a/b/c itself, rather than sending such content to a separate repository service or other site external to the voice application sites 306a/b/c.

As such, in accordance with at least one embodiment of the invention, individual voice application sites 306a/b/c interact directly with media or arrangements for transmitting selected content or for affording payment options for content. Thus, as shown in accordance with a present example, content selected by the user 302 for content wallet repository 310a of voice application site 306a is transmitted to the World Wide Web 314 while that selected by the user 302 for content wallet repository 310b of voice application site 306b is transmitted to media creation arrangement 318. (Such selected content, in both cases, is indicated at 322.) Further, in a present example, voice application site 306b individually interacts with payment gateway 312 in order to process a payment for some or all of the content selected by user 302 for content wallet repository 310b. It can readily be appreciated that, in an arrangement such as that discussed and illustrated with respect to FIG. 3, a voice application site 306a/b/c/d can benefit from being able to sell its UGC independently, rather than subsume it to a collective repository (208) as described hereinabove with respect to FIG. 2.

In accordance with at least one other variant embodiment of the invention, it is conceivable to add content to a content wallet automatically, as opposed to a user specifically directing when and how content enters a content wallet. This can be based on a user preset, that is inherent in a voice application site when a site is set up, whereupon a predetermined action by any user of a voice application site triggers an automatic deposit into a content wallet. Other automatic deposits of content can be based on other triggers, such as a simple time-based trigger (e.g., a type of content is deposited into a content wallet at predetermined time intervals) or capacity-based trigger (e.g., when a content wallet reaches a predetermined capacity, an automatic deposit of a given type of content is triggered).

In accordance with yet at least one other variant embodiment of the invention, it is conceivable to configured content wallets so as to be purpose-based. In this manner, parallel wallets for a given user, and in communication with at least one voice application site, may be provided, wherein a deposit will be made into one wallet or another based on a specific purpose or function. The user can direct such deposits via specific commands, or the allocation to specific wallets can be automatic based on the nature of a portion of the voice application site from which the content to be deposited originates.

Figure 4:
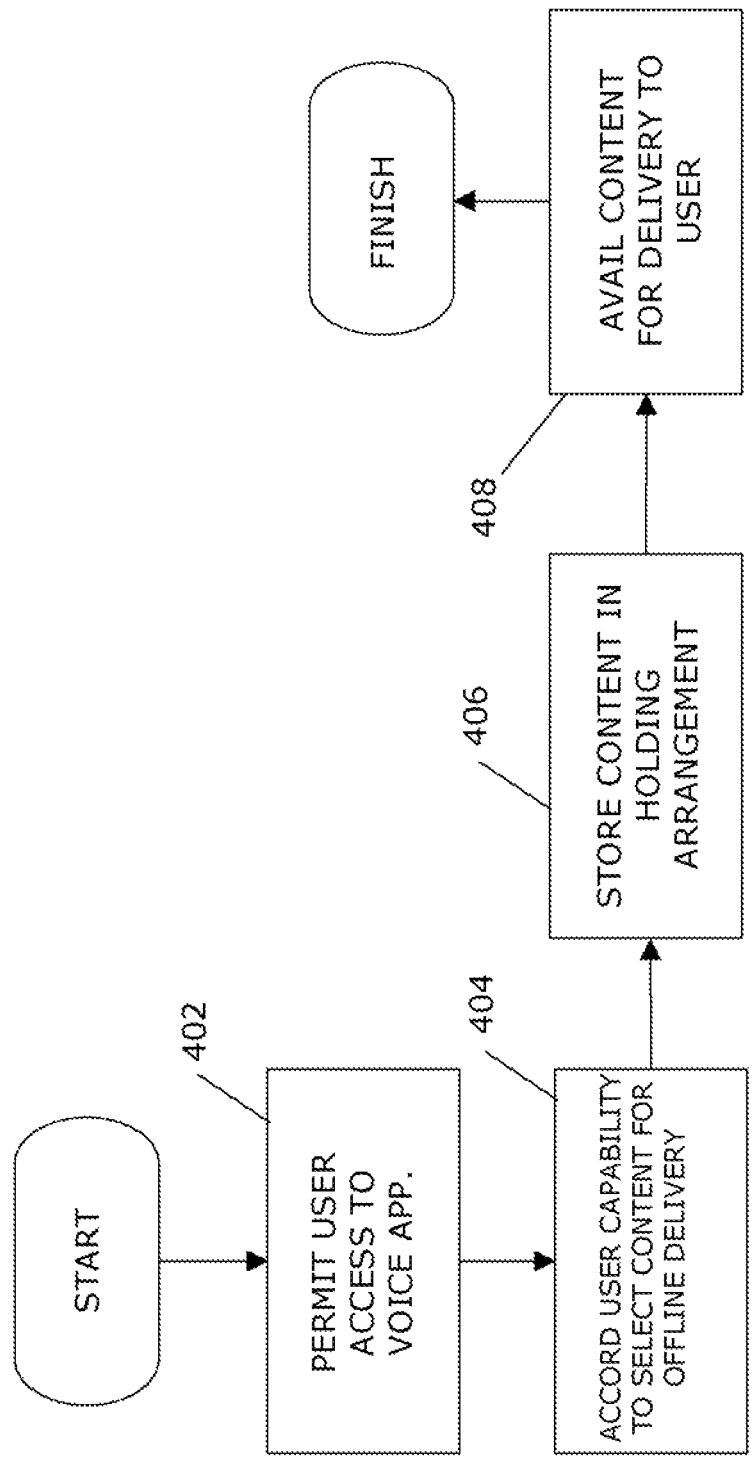
FIG. 4 sets forth a process more generally for facilitating offline delivery of content available in voice applications.

FIG. 4 sets forth a process more generally for facilitating offline delivery of content available in voice applications, in accordance with at least one embodiment of the invention. It should be appreciated that a process such as that broadly illustrated in FIG. 4 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 4 can be performed by way a processing unit or units and system memory such as those indicated, respectively, at 16 and 28 in FIG. 1.

As shown in FIG. 4, user access to a voice application is permitted (402), and the user is accorded a capability to select content in the voice application for offline delivery (404). The selected content is stored in a holding arrangement (406), and the selected content is availed for delivery to the user (408).

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
utilizing a processor to execute computer code configured to perform the steps of:
accepting voice input of a user during user access to a spoken web application comprising audio content arranged as a voice application site, wherein the user access comprises use of a telephone, and the spoken web application is hosted by a voice application platform interfacing with a plurality of voice application sites;
wherein the voice application platform provides programmatic application program interfaces (APIs) for use with a voice activated user interface to forward content collection commands to one or more of the plurality of voice application sites;
accepting user voice input to select, using the voice activated user interface, a voice application site for non-voice delivery;
providing, using the voice application platform, a voice command of the voice input selecting the voice application site to the voice application site;
generating, using the voice activated user interface, one or more spoken annotation tags for the voice application site, wherein the one or more spoken annotation tags are associated with a location in the voice application site;
saving and storing the selected voice application site and the one or more spoken annotation tags in a content wallet, wherein the content wallet is accessible both when the user accesses the voice application site and after the user has disconnected from the voice application site and wherein the user can access one or more spoken annotation tags and the associated location in the voice application site using the content wallet; and
availing the content wallet for delivery to the user subsequent to storage;
wherein said storing comprises accumulating more than one selected voice application site with respect to at least two sessions of user access to the voice application platform.

2. The method according to claim 1, wherein said availing comprises copying the content wallet and storing the copied content wallet on an electronic medium accessible via the Internet for electronic delivery to the user.

3. The method according to claim 1, wherein said accepting comprises according the user a capability to select content from at least two voice application sites.

4. The method according to claim 1, wherein the content wallet comprises a repository for holding content specific to the user.

5. The method according to claim 4, wherein the content wallet further comprises a repository for holding content specific to other users.

6. The method according to claim 5, wherein the content wallet comprises a repository for collective use by at least two users.

7. The method according to claim 1, further comprising accessing a payment gateway to process charging for offline delivery of selected content.

8. The method according to claim 1, wherein the content wallet comprises a repository for holding content specific to a dedicated voice application site.

9. The method according to claim 8, further comprising accessing a payment gateway to process charging for offline delivery of selected content associated with the dedicated voice application site.

10. The method according to claim 1, wherein said storing comprises storing the selected content solely with respect to a single session of user access to the voice application.

11. The method according to claim 1, further comprising appending meta-information to selected content.

12. The method according to claim 11, wherein the meta-information comprises at least one taken from the group consisting of: identifying information for a voice application site from which the selected content derives; time of collection of the selected content; a user-generated annotation.

13. The method according to claim 12, wherein the meta-information comprises a user-generated annotation.

14. The method according to claim 1, wherein the content wallet comprises a repository for collective use by at least two users.

15. The method according to claim 1, wherein the content wallet comprises a repository for holding content specific to two or more voice application sites.

16. The method according to claim 15, wherein the content wallet comprises at least one application programming interface configured for supporting commands for content collection at a voice application site.

17. The method according to claim 1, wherein said availing comprises copying and storing the content wallet to a secondary media for delivery to the user outside of the voice application site.

18. The method according to claim 17, wherein the secondary media comprises a physical media selected from the group consisting of: compact disc, audio tape, and universal serial bus stick.

19. The method according to claim 17, wherein the secondary media comprises an electronic medium selected from the group consisting of: MP3, email, multimedia messaging service (MMS), internet based file and content sharing account.

20. The method according to claim 2, wherein the electronic medium is selected from the group consisting of: MP3, email, multimedia messaging service (MMS), internet based file and content sharing account.

* * * * *